(12) United States Patent
Ogura et al.

(10) Patent No.: US 11,907,914 B2
(45) Date of Patent: Feb. 20, 2024

(54) MAINTENANCE PORTABLE TERMINAL AND CONTROL METHOD THEREFOR

(71) Applicant: TOSHIBA TEC KABUSHIKI KAISHA, Tokyo (JP)

(72) Inventors: Kazuhiro Ogura, Hiratsuka Kanagawa (JP); Tatsuya Inagi, Izu Shizuoka (JP); Hiroyo Tanaka, Tokyo (JP); Masaki Narahashi, Tokyo (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 123 days.

(21) Appl. No.: 17/549,582

(22) Filed: Dec. 13, 2021

(65) Prior Publication Data
US 2022/0309472 A1    Sep. 29, 2022

(30) Foreign Application Priority Data

Mar. 24, 2021    (JP) .................. 2021-050533

(51) Int. Cl.
*G06Q 10/20* (2023.01)
*H04L 12/40* (2006.01)

(52) U.S. Cl.
CPC ....... *G06Q 10/20* (2013.01); *H04L 12/40163* (2013.01)

(58) Field of Classification Search
CPC ... H04W 76/10; H04W 12/009; H04W 12/03; H04W 24/04; G06Q 12/009; G06Q 10/20
See application file for complete search history.

(56) References Cited

U.S. PATENT DOCUMENTS

| | | | | |
|---|---|---|---|---|
| 5,950,148 A | * | 9/1999 | Nakagawa | H04L 43/0817 340/3.3 |
| 7,453,590 B2 | * | 11/2008 | Yoshiura | H04N 1/00127 358/1.15 |
| 9,843,695 B2 | * | 12/2017 | Genda | H04N 1/00244 |
| 2005/0076052 A1 | * | 4/2005 | Kojima | G06Q 30/06 707/999.102 |
| 2010/0111094 A1 | * | 5/2010 | Tanikawa | H04L 67/61 370/401 |
| 2011/0238817 A1 | * | 9/2011 | Okita | H04L 43/0817 709/224 |
| 2015/0256525 A1 | * | 9/2015 | Takaoka | H04W 12/06 726/7 |
| 2021/0192481 A1 | * | 6/2021 | Kakinoki | G06Q 20/405 |

FOREIGN PATENT DOCUMENTS

JP    2019-201322 A    11/2019

* cited by examiner

*Primary Examiner* — Abdelnabi O Musa
(74) *Attorney, Agent, or Firm* — Kim & Stewart LLP

(57) ABSTRACT

According to an embodiment, a portable terminal provides maintenance information to a maintenance server that manages the maintenance information. The portable terminal acquires the maintenance information from an external recording medium. The portable terminal acquires, from the maintenance server, rank information indicating a transmission priority defined for the maintenance information. The portable terminal determines, in accordance with a type of a communication line that can be used by a communication device and the rank information, whether to transmit the maintenance information.

6 Claims, 13 Drawing Sheets

| Customer ID | Apparatus ID | Date | Individual maintenance information |
|---|---|---|---|
| CA | DX | 20210701 | ... |
| CA | DX | 20210714 | ... |
| CA | DY | 20210701 | ... |
| CA | DY | 20210714 | ... |
| CB | DZ | 20210702 | ... |
| CB | DZ | 20210713 | ... |

Fig.3

| Apparatus ID | Type | Item | Rank | Number of uses | Total number |
|---|---|---|---|---|---|
| DX | Color machine | Counter | A | 999 | 999 |
| DX | Color machine | Color ratio | B | 100 | 999 |
| DX | Color machine | Room temperature | B | 499 | 999 |
| DZ | Monochrome machine | Counter | A | 888 | 900 |
| DZ | Monochrome machine | Color ratio | B | 23 | 900 |
| DZ | Monochrome machine | Room temperature | A | 800 | 900 |

Fig.5

| Customer ID | Category | Permission situation |
|---|---|---|
| CA | Usage status | Permitted |
| CA | Installation environment | Unpermitted |
| CB | Usage status | Permitted |
| CB | Installation environment | Permitted |

Fig.8

MAINTENANCE PORTABLE TERMINAL AND CONTROL METHOD THEREFOR

CROSS-REFERENCE TO RELATED APPLICATIONS

This application is based upon and claims the benefit of priority from the prior Japanese Patent Application No. 2021-050533, filed on Mar. 24, 2021, the entire contents of which are incorporated herein by reference.

FIELD

An embodiment to be described here generally relates to a portable terminal and a control method therefor.

BACKGROUND

An image forming apparatus has automatically transmitted, when an abnormality occurs in itself, maintenance information such as aircraft information and error information to a service center using a communication line such as the Internet. A service person has judged the necessity of maintenance such as on-site repair on the basis of this maintenance information.

Data transmission to the service center is performed by connecting to a network outside the image forming apparatus. For this reason, dur to security concerns such as the possibility of leakage of aircraft information, permission for connecting to an external network is not obtained in some cases. In this case, the image forming apparatus cannot transmit maintenance information to the service center.

In this regard, it was considered to transmit maintenance information using a portable terminal of the service person. However, since the size of data to be transmitted may be large, there have been problems such as feasibility, communication cost, and whether the data can be transmitted within a realistic time in the case of the line of the portable terminal.

BRIEF DESCRIPTION OF THE DRAWINGS

FIG. 3 is a diagram showing an example of terminal maintenance information according to the embodiment;

FIG. 5 is a diagram showing an example of server maintenance information according to the embodiment;

FIG. 8 is a diagram showing an example of permission information according to the embodiment;

DETAILED DESCRIPTION

Figure 1:
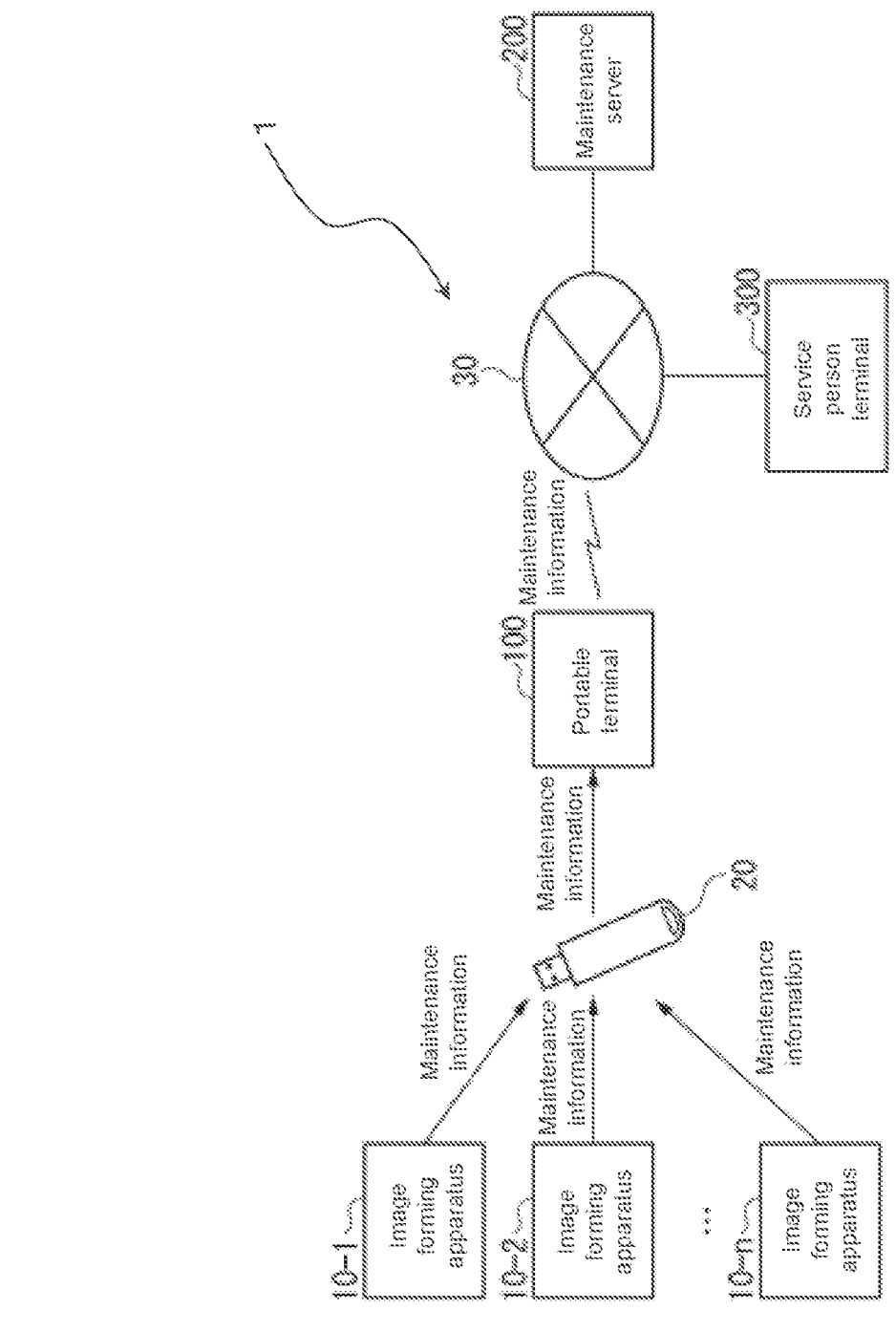
FIG. 1 is a diagram showing an example of a whole configuration of a system including a portable terminal according to an embodiment.

In accordance with an embodiment, a portable terminal provides maintenance information to a maintenance server that manages the maintenance information. The portable terminal includes a port, a communication device, and a processor. An external recording medium is connected to the port, the maintenance information being recorded in the recording medium. The communication device uses a communication line of a different type to communicate with the maintenance server. The processor acquires the maintenance information from the recording medium. The processor acquires, from the maintenance server via the communication device, determination information for determining a transmission priority of the maintenance information. Further, the processor determines, on the basis of a type of a communication line that can be used by the communication device and the acquired determination information, whether to transmit the acquired maintenance information.

A portable terminal according to an embodiment suitably makes it possible to transmit maintenance information of an image forming apparatus. Hereinafter, the portable terminal according to the embodiment, a control method therefor, and the like will be described in detail. In the drawings, the same reference symbols denote the same or similar portions.

FIG. 1 is a diagram showing an example of a whole configuration of a maintenance system 1 including a portable terminal 100 according to the embodiment. The maintenance system 1 shown in FIG. 1 includes n image forming apparatuses 10-1, . . . , 10-n, the portable terminal 100, a maintenance server 200, a service person terminal 300, and a network 30 connecting them. Hereinafter, when the image forming apparatuses 10-1, . . . , 10-n are not particularly distinguished from each other, an arbitrary one will be referred to as the image forming apparatus 10.

The image forming apparatus 10 includes a printer, a scanner, and the like. The image forming apparatus 10 stores maintenance information in a storage device of its own. Note that the maintenance information is information relating to maintenance of the image forming apparatus 10. This maintenance information is, for example, information to which a service person refers.

The image forming apparatus 10 is capable of providing maintenance information to the outside of the apparatus by some methods. The first method is a method of transmitting maintenance information to another apparatus such as the maintenance server 200 via a network. The second method is a method of recording maintenance information in a recording medium such as a USB (Universal Serial Bus) memory. The third method is a method of displaying, on a display device of the image forming apparatus 10, a two-dimensional code indicating maintenance information and causing a smartphone or the like to read the two-dimensional code. In the embodiment described below, a mode for using the second method of recording maintenance information in a recording medium to transmit the maintenance information to the maintenance server 200 will be described.

A USB memory 20 is inserted into a USB port of the image forming apparatus 10. The USB memory 20 is inserted into the image forming apparatus 10, and thus, maintenance information is recorded. The portable terminal 100 is a terminal used by a service person. The portable terminal 100 acquires maintenance information from the USB memory 20 in which maintenance information is recorded, and stores the maintenance information in a storage device of the portable terminal 100. Further, the portable terminal 100 provides maintenance information to the maintenance server 200 via a portable terminal network and the network 30. The service person terminal 300 is a terminal for accessing the maintenance server 200 and for a service man to, for example, browse maintenance information. The service person terminal 300 is, for example, a desktop personal computer or a smartphone.

Note that the maintenance information provided by the image forming apparatus 10, the maintenance information stored in the portable terminal 100, and the maintenance information stored in the maintenance server 200 may have different data structures, different data items, and the like. For example, the portable terminal 100 may edit the maintenance information read from the USB memory 20 into a data structure and an item name for the maintenance server 200. In the following description, in the case where the maintenance information stored in the portable terminal 100 and the maintenance information stored in the maintenance server 200 are particularly distinguished from each other, the pieces of information will be referred to as the terminal maintenance information and the server maintenance information, respectively. Both the terminal maintenance information and the server maintenance information are each an example of the maintenance information.

Figure 2A:
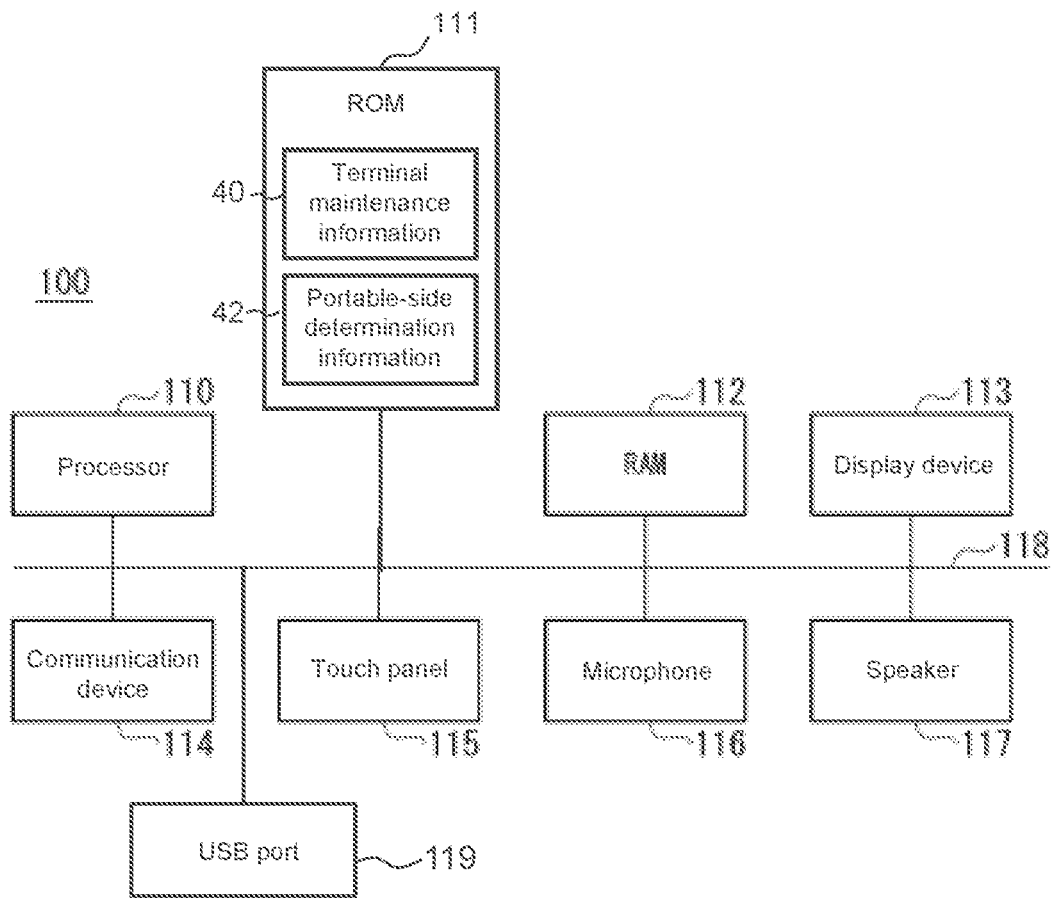
FIG. 2A is a block diagram showing the portable terminal according to the embodiment.

FIG. 2A is a block diagram showing the portable terminal 100. The portable terminal 100 includes a processor 110. The processor 110 is, for example, a CPU (Central Processing Unit). The portable terminal 100 further includes a ROM (Read Only Memory) 111, a RAM (Random Access Memory) 112, a display device 113, a communication device 114, a touch panel 115, a microphone 116, a speaker 117, and a USB port 119. The respective units shown in FIG. 2A are connected by a bus 118.

The processor 110 controls the whole portable terminal 100. The ROM 111 is a flash memory that stores a program of the portable terminal 100, various types of data, and the like. The processor 110 of the portable terminal 100 reads maintenance information from the USB memory 20 connected to the USB port 119. The read maintenance information is stored in the ROM 111. A program is expanded in the RAM 112 and temporal data is stored in the RAM 112. The display device 113 includes a liquid crystal display, an organic EL display, or the like. The communication device 114 is capable of performing communication using a communication line of a different type. In this embodiment, the communication device 114 is capable of performing communication using communication lines of respective types of 3G, 4G (LTE (Long Term Evolution)), and Wi-Fi (registered trademark). Note that in addition to or instead of these communication lines, the communication device 114 may be capable of performing communication using 5G and Bluetooth (registered trademark).

The touch panel 115 is disposed to overlap with the display device 113 and receives an input by a service person. Voice is input to the microphone 116 during a call or the like. The speaker 117 outputs sounds such as ringtones. The USB port 119 is an interface to which a USB memory is connected.

Figure 2B:
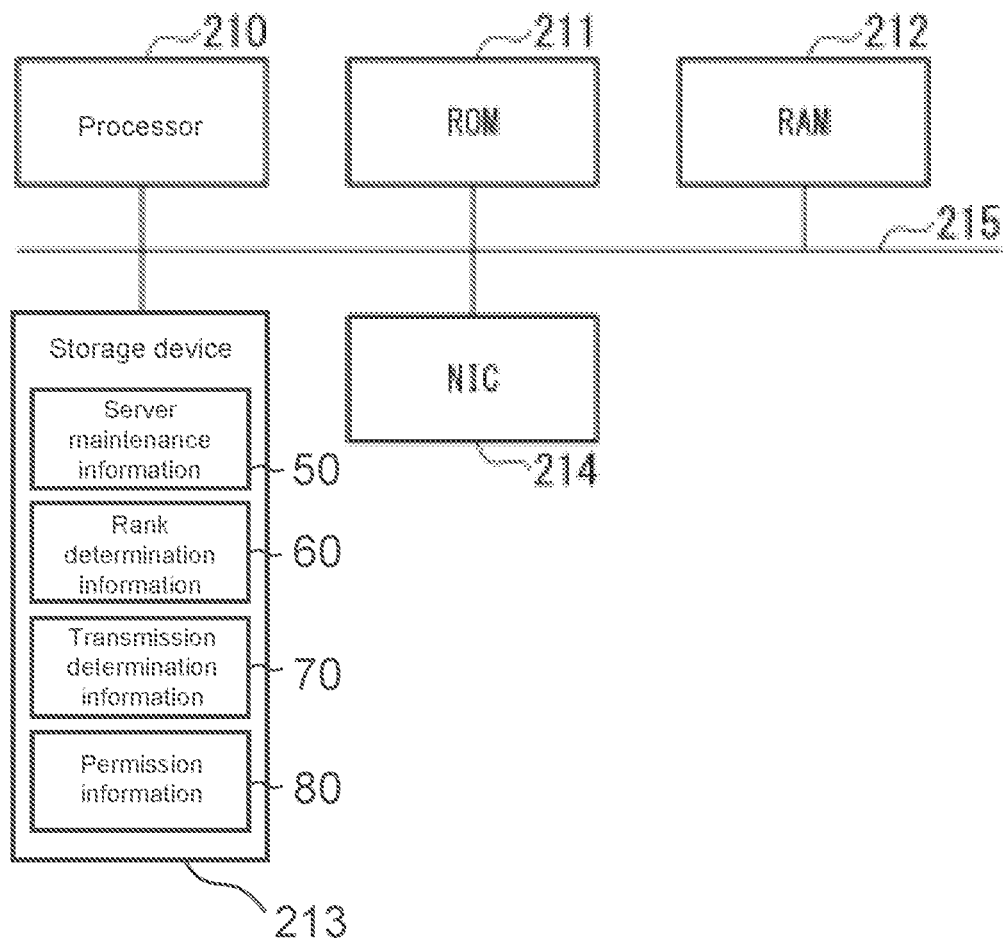
FIG. 2B is a block diagram showing a maintenance server according to the embodiment.

FIG. 2B is a block diagram showing the maintenance server 200. The maintenance server 200 includes a processor 210. The processor 210 is a CPU. The maintenance server 200 further includes a ROM 211, a RAM 212, a storage device 213, and a NIC (Network interface Controller) 214. The respective units shown in FIG. 2B are connected by a bus 215.

The processor 210 controls the whole maintenance server 200. The ROM 211 is a flash memory in which a BIOS (Basic Input/Output System) or the like of the maintenance server 200 is stored. A program is expanded in the RAM 212 and temporal data is stored in the RAM 212. The storage device 213 includes an HDD (Hard Disk Drive), an SSD (Solid State Drive), or the like. A program of the maintenance server 200, server maintenance information 50 (see FIG. 5), and the like are stored in the storage device 213. The NIC 214 is a controller for connecting to a network.

FIG. 3 is a diagram showing an example of terminal maintenance information 40 stored in the portable terminal 100. The terminal maintenance information is stored in the ROM 111 of the portable terminal 100. The terminal maintenance information shown in FIG. 3 includes pieces of maintenance information of three image forming apparatuses 10 as an example. The terminal maintenance information includes a customer ID, an apparatus ID, a date, and individual maintenance information 41 (see FIG. 4).

The customer ID is identification information uniquely identifying a customer using the image forming apparatus 10. The apparatus ID is identification information uniquely identifying the image forming apparatus 10. The date indicates the data when the individual maintenance information 41 has been acquired. As shown in FIG. 3, the customer ID and the image forming apparatus 10 are associated with each other.

Figure 4:
FIG. 4 is a diagram showing an example of individual maintenance information according to the embodiment.

FIG. 4 is a diagram showing an example of the individual maintenance information 41 included in the terminal maintenance information 40. The individual maintenance information 41 includes a category, an item, and a value. The category indicates classification of maintenance information. In this embodiment, three types of categories, "usage status", "installation environment", and "debugging", are set, but are not limited to these. The item belongs to a category and indicates an item of data within the category.

The counter shown in FIG. 4 indicates the cumulative number of printed sheets (two in one sheet in the case of double-sided printing) from a predetermined time (e.g., time when the counter is reset). In the case of FIG. 4, the counter is 12345. The color ratio indicates the ratio of the number of color-printed sheets from the predetermined time to the counter. In the case of FIG. 4, the color ratio is 50%. The room temperature indicates the room temperature (e.g., the maximum room temperature or the average room temperature) detected by the image forming apparatus 10 on the day when the individual maintenance information 41 is acquired. In the case of FIG. 4, the room temperature is 24° C. D log indicates the file name of a debug log. In the case of FIG. 4, the file name is DL20210701.txt.

The maintenance information is not limited to the individual maintenance information 41 shown in FIG. 4. Examples of other maintenance information include the remaining amount of toner, the operating time of the image forming apparatus 10, and the idle time.

FIG. 5 is a diagram showing an example of the server maintenance information 50 stored in the maintenance server 200. The server maintenance information 50 includes an apparatus ID, a type, an item, a rank, the number of uses, and the total number. Of these, the apparatus ID is the same as the apparatus ID shown in FIG. 3. Further, the item is the same as the item shown in FIG. 4. The type indicates whether the image forming apparatus 10 is a color machine or a monochrome machine. The rank is an example of rank information and indicates a transmission priority. The transmission priority is used for the portable terminal 100 to determine whether to transmit maintenance information.

The priority decreases in the order of ranks A, B, and C. That is, maintenance information is most likely to transmit in the case of the rank A, and is least likely to transmit in the case of the rank C. Further, the rank changes in accordance with the number of uses or the like.

The number of uses indicates how many times the service person terminal 300 viewed the information shown in the item of the maintenance information of the image forming apparatus corresponding to the apparatus ID. The total number indicates how many times the service person terminal 300 viewed the maintenance information of the image forming apparatus 10 corresponding to the apparatus ID.

The total number and the number of uses will be specifically described. Regarding the total number, for example, when one of the counter, the color ratio, and the room temperature of the image forming apparatus 10 whose apparatus ID is DX is viewed, the total number corresponding to each of the counter, the color ratio, and the room temperature increases by one. Only the number of uses corresponding to the viewed item increases by one. For example, in the case where the counter is viewed, only the number of uses of the counter increases by one.

In FIG. 5, for example, the maintenance information of the image forming apparatus 10 corresponding to the apparatus ID of DX has been viewed 999 times. Regarding the number of uses, for example, the item of the counter and the item of the color ratio of the maintenance information of the image forming apparatus 10 corresponding to the apparatus ID of DX have respectively been viewed 999 times and 100 times. From this, it can be seen that the color ratio of the maintenance information of the image forming apparatus 10 corresponding to the apparatus ID of DX is constantly viewed when the maintenance information is viewed. Further, it can be seen that the color ratio is viewed approximately once in 10 times (100/999) when the maintenance information of the image forming apparatus 10 corresponding to the apparatus ID of DX is viewed.

Figure 6:
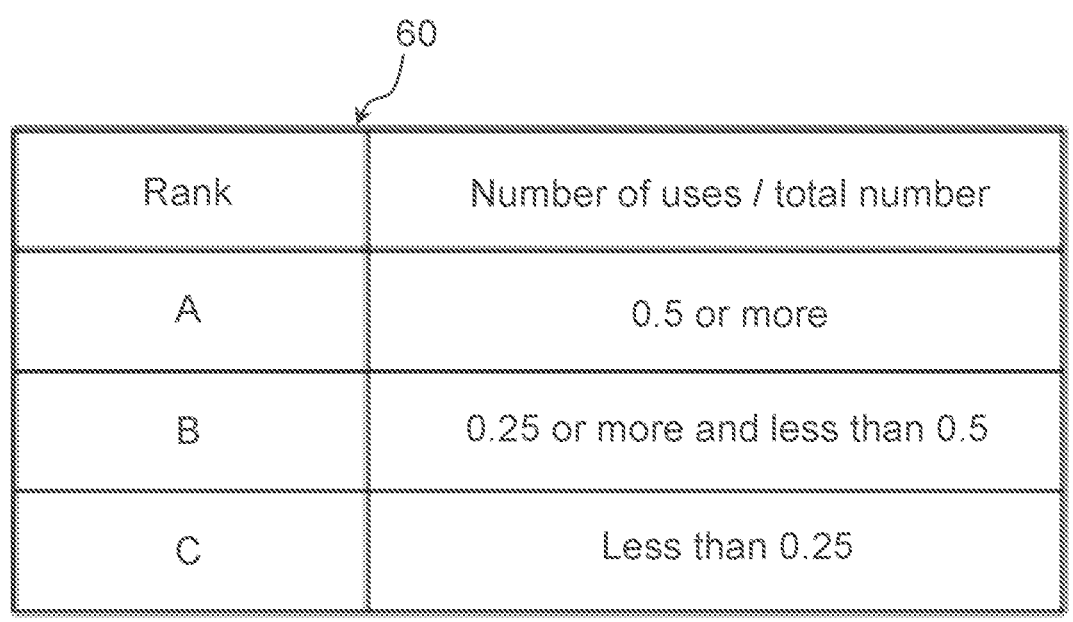
FIG. 6 is a diagram showing an example of rank determination information according to the embodiment.

FIG. 6 is a diagram showing an example of rank determination information 60 stored in, for example, the storage device 213 of the maintenance server 200. The rank determination information 60 is information for the maintenance server 200 to determine the rank. The rank in the server maintenance information 50 is a rank A in the case where the number of uses/the total number is 0.5 or more. The rank in the server maintenance information 50 is a rank B in the case where the number of uses/the total number is 0.25 or more and less than 0.5. The rank in the server maintenance information 50 is a rank C in the case where the number of uses/the total number is less than 0.25.

The larger the number of uses to the total number, the more the service person is paying attention to the item. That is, as the number of uses to the total number becomes larger, the item is more relatively important in maintenance. The transmission priority is increased (to a higher rank) for such an item. The maintenance server 200 derives the number of uses/the total number each time the total number or the number of uses in the maintenance information changes, and determines the rank on the basis of the rank determination information.

Figure 7:
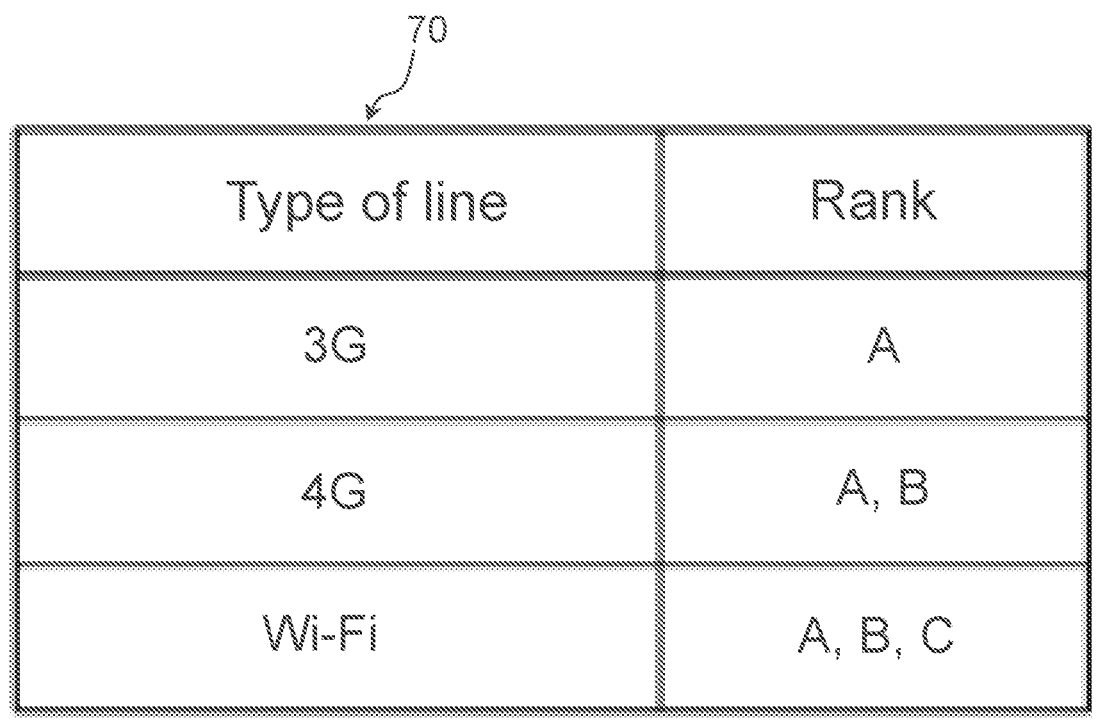
FIG. 7 is a diagram showing an example of transmission determination information according to an embodiment.

FIG. 7 is a diagram showing an example of transmission determination information 70 stored in, for example, the storage device 213 of the maintenance server 200. Note that this transmission determination information 70 is distributed to the portable terminal 100, and is used to determine whether to transmit maintenance information by the portable terminal 100. The timing at which the transmission determination information 70 is distributed to the portable terminal 100 is when being requested by the portable terminal 100.

The transmission determination information 70 includes a type of a communication line and a rank. In the case where the type of an available communication line is 3G, the portable terminal 100 transmits only maintenance information with the rank A to the maintenance server 200. In the case where the type of an available communication line is 4G, the portable terminal 100 transmits maintenance information with the rank B to the maintenance server 200. In the case where the type of an available communication line is Wi-Fi, the portable terminal 100 transmits pieces of maintenance information with the rank A, the rank B, and the rank C (all pieces of maintenance information) to the maintenance server 200. As described above, in the case where the transmission priority (rank) indicates the highest priority (rank A), the portable terminal 100 transmits maintenance information even when a communication line that can be used by the communication device 114 is of any type.

FIG. 8 is a diagram showing an example of permission information 80 stored in, for example, the storage device 213 of the maintenance server 200. Note that this permission information 80 is distributed to the portable terminal 100, and is used to determine whether to transmit maintenance information by the portable terminal 100. The timing at which the permission information 80 is delivered to the portable terminal 100 is when the portable terminal 100 requested for the permission information 80. Further, the permission information 80 is updated by the portable terminal 100 in some cases. The permission information 80 updated by the portable terminal 100 is transmitted to the maintenance server 200. In this case, the maintenance server 200 updates the permission information 80.

The permission information 80 includes a customer ID, a category, and a permission situation. The customer ID is the same as the customer ID shown in FIG. 3. The apparatus ID is the same as the apparatus ID shown in FIG. 3. The category is the same as the category shown in FIG. 4. The permission situation indicates whether or not the transmission of the item that belongs to the category of the maintenance information has been permitted. For example, in FIG. 8, the transmission of the item whose category belongs to the usage status of the maintenance information of the image forming apparatus 10 associated with the customer whose customer ID is CA to the customer is permitted.

Figure 9:
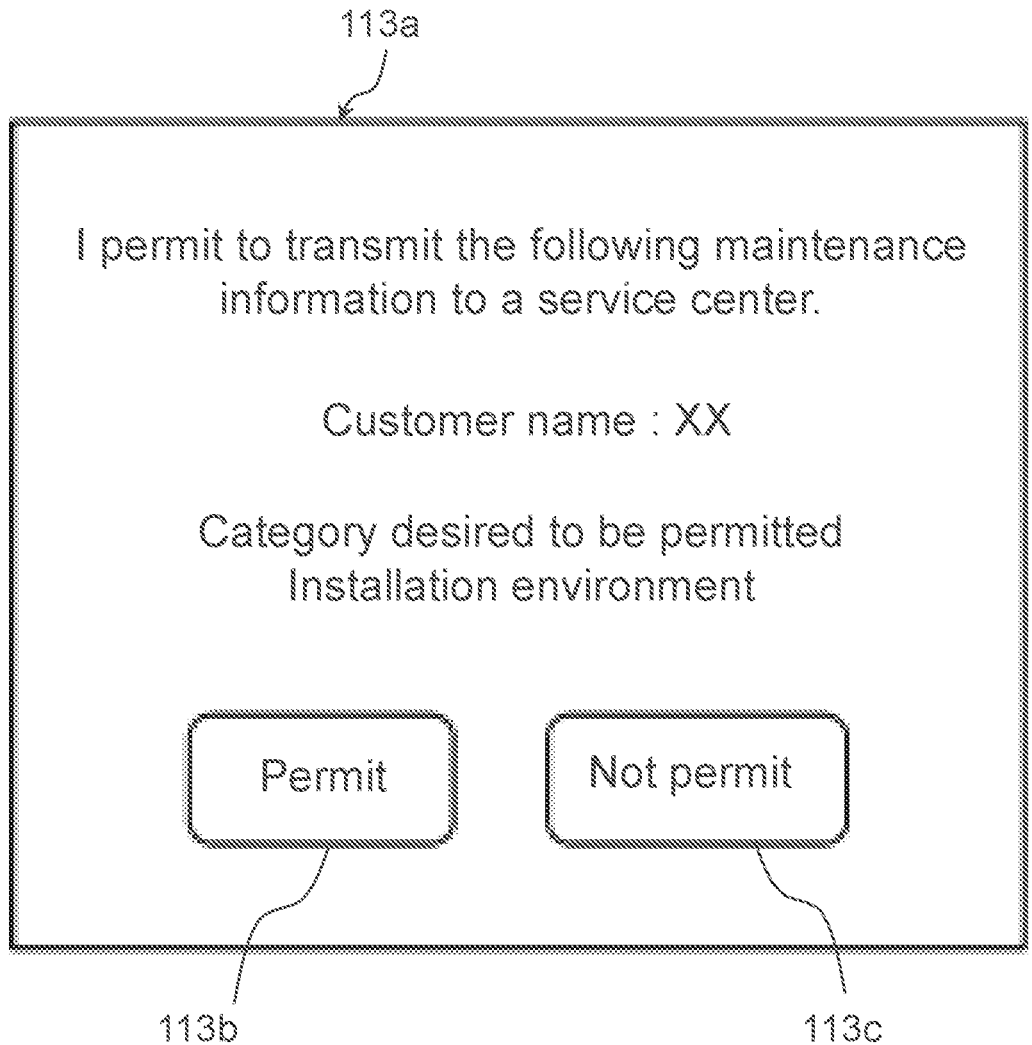
FIG. 9 is a diagram showing an example of a permission screen according to the embodiment.

FIG. 9 is a diagram showing an example of a permission screen 113a displayed on the display device 113 of the portable terminal 100. A service person may use the portable terminal 100 to have a customer set whether to transmit maintenance information at, for example, the customer's site. At this time, the service person displays, on the portable terminal 100, the permission screen 113a shown in FIG. 9. The permission screen 113a shown in FIG. 9 is a screen for setting the permission to transmit the item whose category belongs to the installation environment, as an example.

The service person presents, to a customer, the portable terminal 100 displaying the permission screen 113a. The customer touches a "Permit" button 113b to permit and touches a "Not permit" button 113c to not permit. Note that the "Not permit" button 113c is touched also in the case of setting not to permit from now on although it has been permitted until now. In the case where the setting content has been updated in the permission screen 113a, the updated permission information 80 is transmitted to the maintenance server 200 as described above.

The customer is capable of setting the permission information 80 in another apparatus other than the portable terminal 100. Specifically, the customer is capable of setting the permission information 80 in a dedicated home page provided for the customer. This home page is provided by a Web server different from the maintenance server 200. When the permission information 80 is set in the home page, the Web server transmits the permission information 80 to the maintenance server 200, and the maintenance server 200 updates the permission information 80.

The permission information 80 and the rank described above are used as a rule for transmitting maintenance information using the portable terminal 100. Some rules are based on a relatively important item in maintenance as shown in the rank. Further, this rule is based on whether or not the customer has given permission. Therefore, since the portable terminal 100 using various lines transmits maintenance information on the basis of the importance of the item and the type of the communication line, the portable terminal 100 suitably makes it possible to transmit maintenance information of an image forming apparatus.

Figure 10:
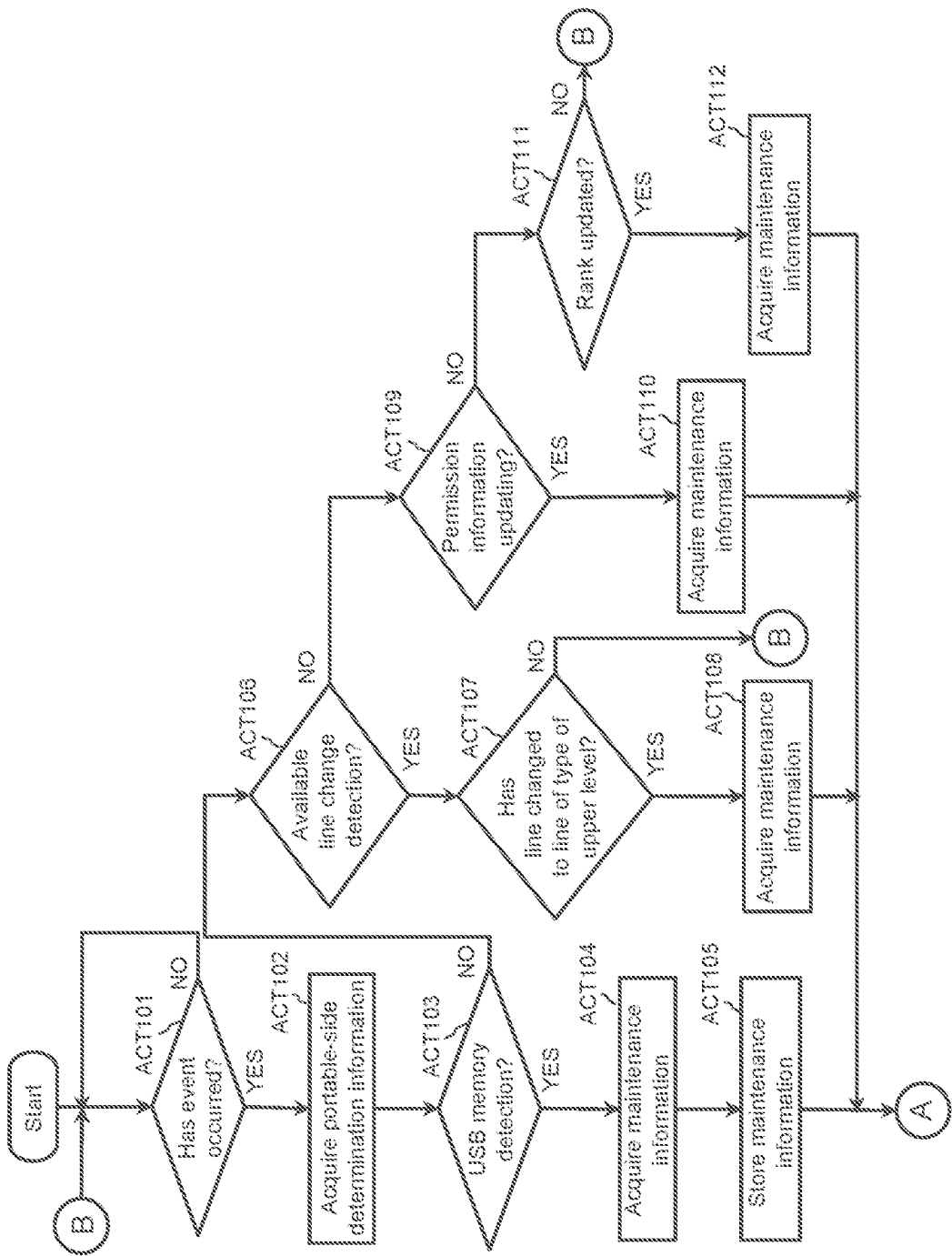
FIG. 10 is a flowchart showing processing of a portable terminal according to the embodiment.
Figure 11:
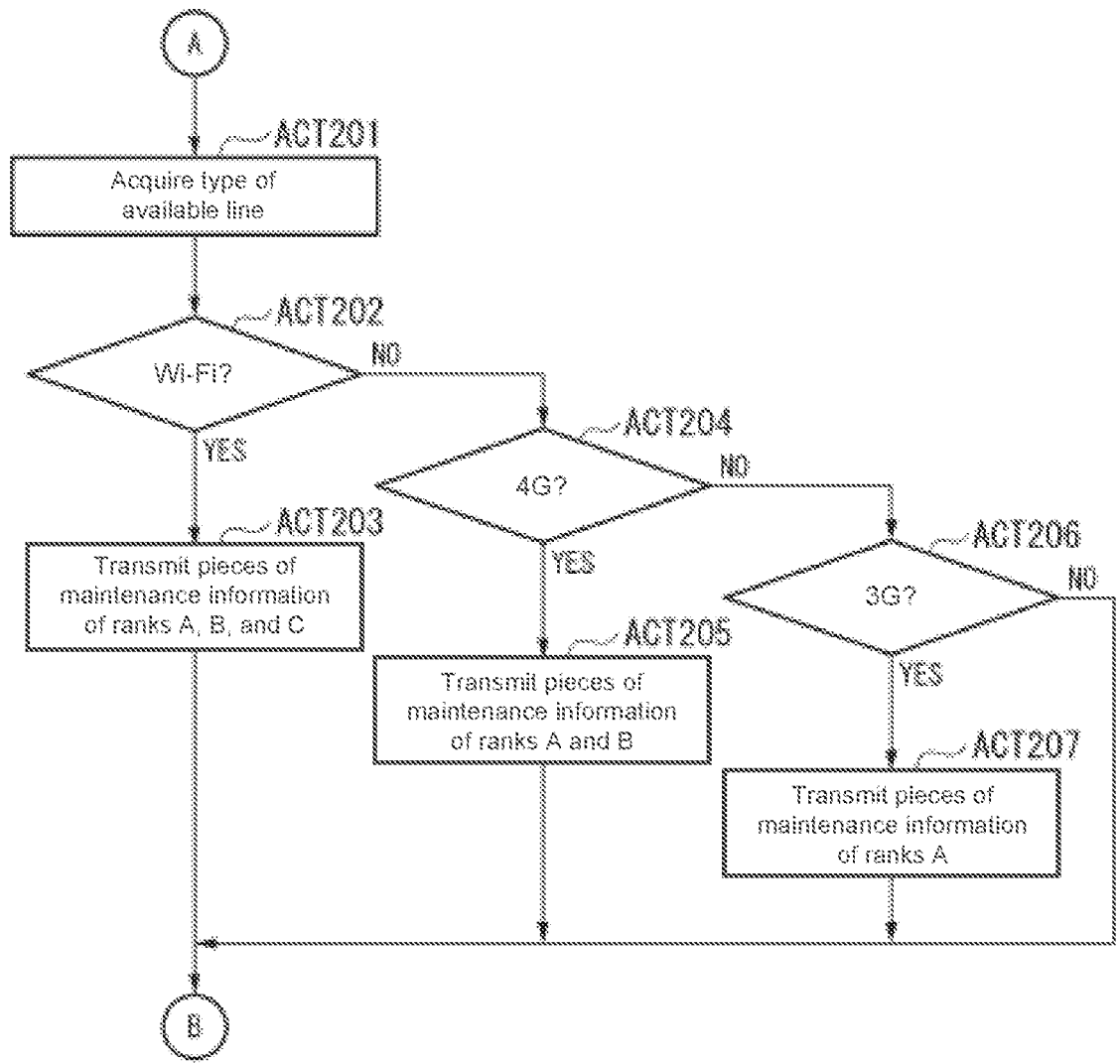
FIG. 11 is a flowchart showing processing of the portable terminal according to the embodiment.

Next, processing of the portable terminal 100 and the maintenance server 200 will be described using a flowchart. FIG. 10 and FIG. 11 are each a flowchart showing processing performed by the processor 110 of the portable terminal 100. In ACT101 in FIG. 10 the processor 110 of the portable terminal 100 determines whether or not an event has occurred. This event includes "USB memory detection", "available line change detection", "permission information updating", and "rank updating".

The "USB memory detection" indicates to have detected that the USB memory 20 that is inserted into the image forming apparatus 10, maintenance information being recorded in the USB memory 20, has been connected to the USB port 119 of the portable terminal 100. The "available line change detection" indicates that a change has occurred in the type of the currently available line. For example, the "available line change detection" indicates that the state has changed from a Wi-Fi unusable state to a Wi-Fi usable state. The "permission information updating" indicates that the maintenance server 200 has notified that the permission information 80 has been updated. The "rank updating" indicates that the maintenance server 200 has notified that the rank has been updated.

When an even has occurred (ACT101: YES), the processing of the processor 110 proceeds to ACT102. In ACT102, the processor 110 of the portable terminal 100 requests portable-side determination information 42 from the maintenance server 200 via a communication device and acquires the portable-side determination information 42 from the maintenance server 200. The portable-side determination information 42 includes the apparatus ID, the item, and the rank, the transmission determination information 70 shown in FIG. 7, and the permission information 80 shown in FIG. 8, of the server maintenance information 50 shown in FIG. 5. The acquired portable-side determination information 42 is stored in the ROM 111. The processing of ACT102 described above is an example of the rank information acquisition unit.

In ACT103, the processor 110 of the portable terminal 100 determines whether or not the event that has occurred is the "USB memory detection". In the case where the event that has occurred is the "USB memory detection" (ACT103: YES), the processing of the processor 110 proceeds to ACT104. In ACT104, the processor 110 of the portable terminal 100 acquires maintenance information from the USB memory 20. In ACT105, the processor 110 stores the acquired maintenance information (the terminal maintenance information 40) in the ROM 111. After that, the processing of the processor 110 proceeds to ACT201 in FIG. 11. The processing of ACT104 descried above is an example of the maintenance information acquisition unit.

In the ACT103 described above, in the case where the event that has occurred is not "the USB memory detection" (ACT103: NO), the processing of the processor 110 proceeds to ACT106. In ACT106, the processor 110 of the portable terminal 100 determines whether or not the event that has occurred is the "available line change detection". In the case where the event that has occurred is the "available line change detection" (ACT106: YES), the processing of the processor 110 proceeds to ACT107. In ACT107, the processor 110 of the portable terminal 100 determines whether or not the line has changed to a line of a type of an upper level.

Note that the line of a type of an upper level represents 4G or Wi-Fi in the case where the type before the change is 3G. In the case where the type before the change is 4G, the type of an upper level is Wi-Fi. In the case where the line has not changed to a line of a type of an upper level (ACT107: NO), the processing of the processor 110 returns to ACT101. In the case where the line has changed to a line of a type of an upper level (ACT107: YES), the processing of the processor 110 proceeds to ACT108. In ACT108, the processor 110 of the portable terminal 100 acquires maintenance information (the terminal maintenance information 40) from the ROM 111. After that, the processing of the processor 110 proceeds to ACT201 in FIG. 11. Note that the maintenance information acquired in ACT108 is maintenance information that could not be transmitted by the type of the line before the change. As described above, in the case where the communication line that can be used by the communication device 114 has changed, the portable terminal 100 determines, in the flowchart in FIG. 11 described below, whether to transmit maintenance information in accordance with the communication line after the change and rank information.

Examples of the case where the line changes to a line of a type of an upper level include a case where a service person returned to the office from a customer's site, for example. At this time, the portable terminal 100 is automatically connected to Wi-Fi in the company. As a result, an event of the "available line change detection" occurs, and thus, maintenance information is transmitted to the maintenance server 200 by the processing described above. Therefore, the service person can transmit maintenance information without operating the portable terminal 100.

In the ACT106 described above, the event that has occurred is not the "available line change detection" (ACT106: NO), the processing of the processor 110 proceeds to ACT109. In ACT109, the processor 110 of the portable terminal 100 determines whether or not the event that has occurred is the "permission information updating". In the case where the event that has occurred is the "permission information updating" (ACT109: YES), the processing of the processor 110 proceeds to ACT110. In ACT110, in the case where the number of permitted categories has increased, the processor 110 of the portable terminal 100 acquires the maintenance information stored in the ROM 111. After that, the processing of the processor 110 proceeds to ACT201 in FIG. 11.

The phrase "the number of permitted categories has increased" represents that a category that has not been permitted until now has been permitted by updating the permission information 80. The maintenance information acquired in ACT110 is maintenance information that could not be transmitted in the case of the permission information 80 before the updating. That is, a difference from the maintenance information transmitted on the basis of the permission information 80 before the updating is transmitted. In the case where the permitted category is no longer permitted and therefore the number of permitted categories decreases, the processor 110 does not execute the processing of ACT110. The processing of the processor 110 proceeds to ACT101.

In ACT109 described above, in the case where the event that has occurred is not the "permission information updating" (ACT109: NO), the processing of the processor 110 proceeds to ACT111. In ACT111, the processor 110 of the portable terminal 100 determines whether or not the event that has occurred is the "rank updating". In the case where the event that has occurred is the "rank updating" (ACT111: YES), the processing of the processor 110 proceeds to ACT111. In ACT111, in the case where the number of pieces of maintenance information that can be transmitted has increased, the processor 110 of the portable terminal 100 acquires the maintenance information stored in the ROM 111. After that, the processing of the processor 110 proceeds to ACT201 in FIG. 11.

Examples of the phrase "the number of pieces of maintenance information that can be transmitted has increased" include a case where the rank of the color ratio that is one of items has changed from B to A by updating the rank. The maintenance information acquired in ACT112 is maintenance information that could not be transmitted in the case of the rank before the updating. That is, a difference from the maintenance information transmitted on the basis of the rank before the updating is transmitted. In the case where the number of pieces of maintenance information that can be transmitted by the updated rank decreases (e.g., changed from the rank A to the rank B), the processor 110 does not execute the processing of ACT112. The processing of the processor 110 returns to ACT101. As described above, in the case where the rank information has changed, the portable terminal 100 determines, in the flowchart in FIG. 11 described below, whether to transmit maintenance information in accordance with the communication line that can be used by the communication device 114 and the rank information after the change.

Subsequently, the processing performed by the processor 110 of the portable terminal 100 will be described with reference to FIG. 11. Note that the transmission determination information 70 acquired in the processing of FIG. 10 is the transmission determination information 70 shown in FIG. 7. In ACT201 in FIG. 11, the processor 110 of the portable terminal 100 acquires the type of the currently available line. In ACT202, the processor 110 of the portable terminal 100 determines whether or not the type of the currently available line is Wi-Fi. In the case where the type of the currently available line is Wi-Fi (ACT202: YES), the processing of the processor 110 proceeds to ACT203. In ACT203, the processor 110 of the portable terminal 100 refers to the permission information 80 and transmits, to the maintenance server 200, pieces of maintenance information (items) of the ranks A, B, and C within the range of the permitted category. After that, the processing of the processor 110 returns to ACT101 in FIG. 10.

In the ACT202 described above, in the case where the type of the currently available line is not Wi-Fi (ACT202: NO), the processing of the processor 110 proceeds to ACT204. In ACT204, the processor 110 of the portable terminal 100 determines whether or not the type of the currently available line is 4G. In the case where the type of the currently available line is 4G (ACT204: YES), the processing of the processor 110 proceeds to ACT205. In ACT205, the processor 110 of the portable terminal 100 refers to the permission information 80 and transmits, to the maintenance server 200, pieces of maintenance information (items) of the ranks A and B within the range of the permitted category. After that, the processing of the processor 110 returns to ACT101 in FIG. 10.

In the ACT204 described above, in the case where the type of the currently available line is not 4G (ACT204: NO), the processing of the processor 110 proceeds to ACT206. In ACT206, the processor 110 of the portable terminal 100 determines whether or not the type of the currently available line is 3G. In the case where the type of the currently available line is 3G (ACT206: YES), the processing of the processor 110 proceeds to ACT207. In ACT207, the processor 110 of the portable terminal 100 refers to the permission information 80 and transmits, to the maintenance server 200, maintenance information (item) of the rank A within the range of the permitted category. After that, the processing of the processor 110 returns to ACT101 in FIG. 10.

In the ACT206 described above, in the case where the type of the currently available line is not 3G (ACT206: NO), since there is no available line, the processor 110 of the portable terminal 100 transmits nothing. After that, the processing of the processor 110 returns to ACT101 in FIG. 10. In ACT201 to ACT207 in FIG. 11, the portable terminal 100 determines whether to transmit maintenance information in accordance with the type of a communication line that can be used by the communication device 114 and the rank information. Therefore, the processing of ACT201 to ACT207 is an example of a determination unit.

Figure 12:
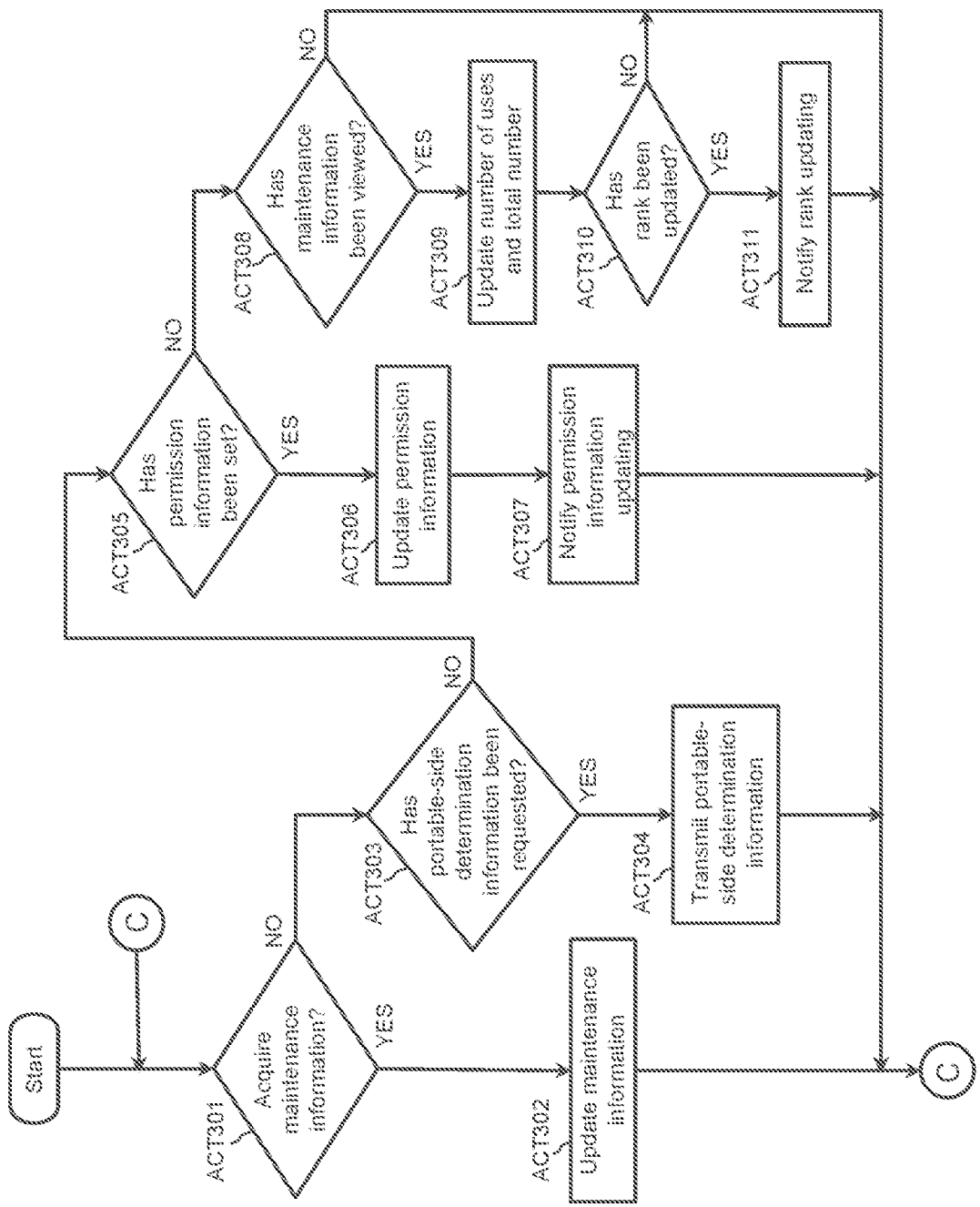
FIG. 12 is a flowchart showing processing of a maintenance server according to the embodiment.

FIG. 12 is a flowchart showing the processing performed by the processor 210 of the maintenance server 200. In ACT301 in FIG. 12, the processor 210 of the maintenance server 200 determines whether or not maintenance information has been acquired from the portable terminal 100. In the case where maintenance information has been acquired (ACT301: YES), the processing of the processor 210 proceeds to ACT302. In ACT302, the processor 210 of the maintenance server 200 updates maintenance information corresponding to the acquired maintenance information of the maintenance information stored in the storage device 213. After that, the processing of the processor 210 returns to ACT301.

Meanwhile, in the case where maintenance information has not been acquired from the portable terminal 100 (ACT301: NO), the processing of the processor 210 proceeds to ACT303. In ACT303, the processor 210 of the maintenance server 200 determines whether or not portable-side determination information has been requested from the portable terminal 100. In the case where the portable-side determination information has been requested (ACT303: YES), the processing of the processor 210 proceeds to ACT304. In ACT304, the processor 210 of the maintenance server 200 acquires, from the storage device 213, the apparatus ID, the item, and the rank of the server maintenance information 50, the transmission determination information 70, and the permission information 80. The processor 210 of the maintenance server 200 transmits the portable-side determination information to the portable terminal 100. After that, the processing of the processor 210 returns to ACT301.

Meanwhile, in the case where the portable-side determination information has not been requested from the portable terminal 100 (ACT303: NO), the processing of the processor 210 proceeds to ACT305. In ACT305, the processor 210 of the maintenance server 200 determines whether or not the permission information 80 has been set. Examples of the case where the permission information 80 is set include a case by the portable terminal 100 and a case by the home page as described above. In the case where the permission information 80 has been set (ACT305: YES), the processing of the processor 210 proceeds to ACT306. In ACT306, the processor 210 of the portable terminal 100 updates the permission information 80. In ACT307, the processor 210 of the maintenance server 200 notifies the portable terminal 100 or the Web server of the permission information updating. After that, the processing of the processor 210 returns to ACT301. In the ACT307 described above, in the case where the permission information 80 has been set in the home page, the processor 210 of the maintenance server 200 notifies the portable terminal 100 of the permission information updating. Further, in ACT307, in the case where the permission information has been set by the portable terminal 100, the processor 210 of the maintenance server 200 notifies the Web server of the permission information updating.

Meanwhile, in ACT305, in the case where the permission information has not been set (ACT305: NO), the processing of the processor 210 proceeds to ACT308. In ACT308, the processor 210 of the maintenance server 200 determines whether or not maintenance information has been viewed from the service person terminal 300. In the case where maintenance information has not been viewed from the service person terminal 300 (ACT308: NO), the processing of the processor 210 of the portable terminal 100 returns to ACT301. Meanwhile, in ACT308, in the case where maintenance information has been viewed from the service person terminal 300 (ACT308:YES), the processing of the processor 210 proceeds to ACT309. In ACT309, the processor 210 of the maintenance server 200 updates the number of uses and the total number of the server maintenance information 50. In ACT310, the processor 210 of the maintenance server 200 determines whether or not the rank has been updated by the updating descried above. In the case where the rank has not been updated (ACT310: NO), the processing of the processor 210 of the maintenance server 200 returns to ACT301. Meanwhile, in ACT310, in the case where the rank has been updated (ACT310: YES), the processing of the processor 210 proceeds to ACT311. In ACT311, the processor 210 of the maintenance server 200 notifies the portable terminal 100 of the rank updating. After that, the processing of the processor 210 returns to ACT301.

The transmission determination information 70 is based on the type of a line in the embodiment described above, but the present disclosure is not limited thereto. The transmission determination information 70 may be based on a communication speed. For example, the communication speed may be divided into less than 10 Mbps, 10 Mbps or more and less than 100 Mbps, and 100 Mbps or more, and a rank may be assigned to each speed.

The rank is determined on the basis of the number of uses and the total number, but the present technology is not limited thereto. For example, the rank may be set by a service person.

In the case where a form in which the maintenance information of the maintenance server 200 is transmitted using a USB memory as in the embodiment described above and a form in which the maintenance information of the maintenance server 200 is transmitted through the Internet are combined, the rank of the item to be transmitted through the Internet may be set to C or aa rank indicating "Not transmit" may be provided.

Although the portable terminal 100 spontaneously transmits the maintenance information to the maintenance server 200 in the embodiment described above, for example, the maintenance information may be transmitted in accordance with a request from the maintenance server 200.

The function of the portable terminal 100 in the above-mentioned embodiment may be realized by a computer. In this case, the program for realizing this function may be recorded in a computer-readable recording medium and the portable terminal 100 may be caused to read and execute the program recorded in this recording medium, thereby realizing the function of the portable terminal 100. Further, the "computer-readable recording medium" represents a storage device such as a USB memory. Further, the "computer-readable recording medium" may include those that dynamically hold programs for a short period of time, such as a communication line when a program is transmitted via a network such as the Internet or a communication line such as a telephone line, and those that hold programs for a certain period of time, such as a volatile memory inside a computer system that serves as a server or client in that case. Further, the program described above may be for realizing part of the above-mentioned function, and may be one capable of realizing the above-mentioned function in combination with the program that has been recorded in the portable terminal 100.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A portable terminal that provides maintenance information to a maintenance server that manages the maintenance information, comprising:
  a port, an external recording medium being connected to the port, the maintenance information being recorded in the external recording medium;
  a communication device that uses a communication line of a different type to communicate with the maintenance server; and
  a processor configured to
    acquire the maintenance information from the recording medium,
    acquire, from the maintenance server via the communication device, determination information for determining a transmission priority of the maintenance information, and
    determine, on a basis of a type of a communication line that can be used by the communication device and the acquired determination information, whether to transmit the acquired maintenance information, wherein
  the determination information includes rank information indicating a transmission priority defined for the maintenance information,
  the maintenance information includes information for each of a plurality of categories, the category includes a plurality of items, and the rank information indicates a transmission priority defined for information for each of the plurality of items of the maintenance information, and the processor determines, on a basis of the type of the communication line that can be used by the communication device and the rank information, whether to transmit the maintenance information for each of the plurality of items of the maintenance information.

2. The portable terminal according to claim 1, wherein the determination information includes, for each of the plurality of categories of the maintenance information, permission information indicating whether or not transmission to the maintenance server is permitted.

3. The portable terminal according to claim 2, further comprising a display device, the processor displaying, on the display device, a permission screen for inputting permission information for each of the plurality of categories for the maintenance information, the processor receiving the input permission information for each of the plurality of categories via the permission screen and transmitting the input permission information for each of the plurality of categories to the maintenance server via the communication device to update the permission information stored in the maintenance server.

4. The portable terminal according to claim 1, wherein the processor determines, where the transmission priority indicated by the rank information represents a highest priority, to transmit the maintenance information even in a case where the communication line that can be used by the communication device is of any type.

5. The portable terminal according to claim 1, wherein the processor determines, where the type of the communication line that can be used by the communication device has changed, whether to transmit the maintenance information in accordance with the communication line of the type after the change and the rank information.

6. A portable terminal that provides maintenance information to a maintenance server that manages the maintenance information, comprising:

a port, an external recording medium being connected to the port, the maintenance information being recorded in the recording medium;

a communication device that uses a communication line of a different type to communicate with the maintenance server; and a processor configured to acquire the maintenance information from the recording medium, acquire, from the maintenance server via the communication device, determination information for determining a transmission priority of the maintenance information, and determine, on a basis of a type of a communication line that can be used by the communication device and the acquired determination information, whether to transmit the acquired maintenance information, wherein the determination information includes rank information indicating a transmission priority defined for the maintenance information, the rank information is determined by the maintenance server on a basis of predetermined rank determination information, and the processor determines, where the rank information has changed, whether to transmit the maintenance information in accordance with the type of the communication line that can be used by the communication device and the rank information after the change.

* * * * *